United States Patent
Pekar et al.

(10) Patent No.: US 9,082,179 B2
(45) Date of Patent: Jul. 14, 2015

(54) AUTOMATIC PROJECTION OF LANDMARKS TO GENERATE ADDITIONAL CORRESPONDENCES IN IMAGE REGISTRATION

(75) Inventors: Vladimir Pekar, Toronto (CA); Stephane Allaire, Toronto (CA)

(73) Assignee: Koninklijke Philips N.V., Eindhoven (NL)

( * ) Notice: Subject to any disclaimer, the term of this patent is extended or adjusted under 35 U.S.C. 154(b) by 221 days.

(21) Appl. No.: 14/000,419

(22) PCT Filed: Feb. 16, 2012

(86) PCT No.: PCT/IB2012/050726
§ 371 (c)(1),
(2), (4) Date: Aug. 20, 2013

(87) PCT Pub. No.: WO2012/114239
PCT Pub. Date: Aug. 30, 2012

(65) Prior Publication Data
US 2013/0329980 A1 Dec. 12, 2013

Related U.S. Application Data

(60) Provisional application No. 61/445,727, filed on Feb. 23, 2011.

(51) Int. Cl.
G06K 9/00 (2006.01)
G06T 7/00 (2006.01)

(52) U.S. Cl.
CPC ..... *G06T 7/0028* (2013.01); *G06T 2207/10072* (2013.01); *G06T 2207/20016* (2013.01); *G06T 2207/30004* (2013.01); *G06T 2207/30204* (2013.01)

(58) Field of Classification Search
None
See application file for complete search history.

(56) References Cited

U.S. PATENT DOCUMENTS 5,926,568 A 7/1999 Chaney et al.
7,460,733 B2 12/2008 Xiao et al.
(Continued)

OTHER PUBLICATIONS

Allaire, S., et al.; Full Orientation Invariance and Improved Feature Selectivity of 3D SIFT with Application to Medical Image Analysis; 2008; IEEE Proc. Math. Meth. Biomed. Imag. Analys. Comp. Vis. Patt. Recog.; pp. 1-8.
Bookstein, F. L.; Principal Warps: Thin-Plate Splines and the Decomposition of Deformations; 1989; IEEE Trans. on Pattern Analysis and Machine Intelligence; 11(6)567-585.

(Continued)

*Primary Examiner* — Tahmina Ansari

(57) ABSTRACT

When registering multiple multidimensional images based on landmarks, the system improves the distribution and density of the points in correspondence across images, which are of crucial importance for the accuracy and reliability of the resulting registration transform. Projection of input corresponding point landmarks is performed in order to automatically generate additional point correspondences. The input existing landmarks may have been manually or automatically located in the input multiple images. Projection is performed from each source landmark along one or more determined projection directions onto one or more determined projection targets in each image. The projection target(s) can be explicitly materialized or implicitly defined. Candidate new points are identified at the locations where the projection ray paths intersect with the projection target(s). Correspondence between the new points across images is transferred from the input landmarks from which they have been projected, with further distinction by projection direction and/or projection target in the case where a plurality of these was used. Subsequent registration can use all or a selected subset of all combined input landmark correspondences and correspondences between additional projected landmark points. The additional correspondences between projected landmark points contribute in refining the image registration. Such accurate, efficient and robust tools for image registration and any downstream processing, such as contour propagation or image fusion, are highly demanded for various medical applications, such as adaptive radiotherapy.

29 Claims, 3 Drawing Sheets

(56) References Cited

U.S. PATENT DOCUMENTS

| | | |
|---|---|---|
| 7,848,592 B2 | 12/2010 | Chen et al. |
| 2007/0041497 A1 | 2/2007 | Schnarr et al. |
| 2009/0187422 A1* | 7/2009 | Kaus et al. ............ 705/2 |
| 2009/0279739 A1 | 11/2009 | Kaus et al. |
| 2011/0158536 A1* | 6/2011 | Nakano et al. ........ 382/190 |
| 2013/0272581 A1* | 10/2013 | Moden .................. 382/106 |
| 2013/0335635 A1* | 12/2013 | Ghanem et al. ....... 348/659 |

OTHER PUBLICATIONS

Sprengel, R., et al.; Thin-Plate Spline Approximation for Image Registration; 1996; Engineering in Medicine and Biology; vol. 3:1190-1191.

Zhang, J., et al.; Mapping postnatal mouse brain development with diffusion tensor microimaging; 2005; NeuroImage; 26:1042-1051.

* cited by examiner

AUTOMATIC PROJECTION OF LANDMARKS TO GENERATE ADDITIONAL CORRESPONDENCES IN IMAGE REGISTRATION

CROSS REFERENCE TO RELATED APPLICATIONS

This application is a national filing of PCT application Ser. No. PCT/IB2012/050726, filed Feb. 16, 2012, published as WO2012/114239 A on Aug. 30, 2012, which claims the benefit of U.S. provisional application serial no. 61/445,727 filed Feb. 23, 2011, which is incorporated herein by reference.

The present application finds particular application in medical imaging systems. However, it will be appreciated that the described technique may also find application in other diagnostic systems, other imaging scenarios, or other diagnostic techniques.

Segmentation of medical images is used in many applications, e.g. radiation therapy (RT), where the delineation of tumors and organs at risk is used both to retrospectively assess treatment delivery with respect to the planning as well as to enable prospective planning and adaptation of the treatment. The extensive contouring task is performed manually or semi-manually and remains very labor-intensive in clinical practice. One goal of adaptive RT is to prospectively react to detected deviations from the initial treatment plan, usually due to significant changes in the patient's anatomy during the course of treatment. Such deviations can be detected from subsequently acquiring additional images, and compensation can be made through re-planning based on re-contouring the additional image.

Major obstacles impeding the clinical implementation of adaptive RT include: 1) the associated additional workload in terms of contouring; and 2) registering time series of many images in a common reference in order to perform dose accumulation and dosimetric assessment of the treatment thus far given. A common strategy to address the contouring issue is to propagate contours from the initial planning images into the additional images and to address the propagation issue using non-rigid (deformable) registration techniques.

To address deformable image registration, most of the existing approaches have operated on the image voxel intensities. However, the assumption of voxel-to-voxel correspondence may be challenged by a significant anatomical variation, as well as inconsistent image noise, artifacts, and changes in the field of view, which all can occur across distinct patients and/or in multi-modality imaging protocols.

In contrast, landmark-based and feature-based approaches, or point-based approaches, are alternative approaches that do not consider every single voxel but only rely, instead, on 1-to-1 correspondences between the actual parts of the images where such correspondence truly exists, namely matches between the shared distinctive landmarks or automated features. Therefore, these approaches share the advantage of being more robust with respect to changing anatomy and variable image artifacts. In addition, if the available matched landmarks were to stem from an automated algorithm, no human workload would be required. A more numerous set of matched landmarks than typical manual anatomical landmark placement techniques could be generated in automated algorithms (typically hundreds or thousands compared to a few dozens).

One issue with such schemes is the distribution of the corresponding landmarks, which may be missing completely, or too few, in certain sub-regions of the images. For instance, only landmarks on the bony anatomy may be picked up in CT data, be it by a human observer or an automated algorithm, due to their reliable distinctiveness or saliency; whereas lower-contrast image regions may lack an acceptable density of matched landmarks. For precise deformable registration, corresponding landmarks need to be dense enough, not leaving too much leeway to interpolation in between such landmarks or control points when determining the deformation field to warp the image or segmentation contour.

The present application relates to new and improved systems and methods that facilitate providing accurate, efficient and robust deformable registration tools, which overcome the above-referenced problems and others.

In accordance with one aspect, a system (10) that facilitates automatically generating additional corresponding points from input existing point landmarks in correspondence across multidimensional images includes an image database (18) that stores at least two images (20) each containing a set of landmarks (manual or automated) with tracked correspondence across images (26), and a processor (32) that executes computer-executable instructions stored in a memory (28) to perform the steps of projecting input landmarks along one or more determined directions onto one or more determined projection targets in each image, and identifying a candidate new point at every location where each projection ray path intersects with a projection target. The processor further executes instructions for assigning correspondence between new points across images by transfer of the correspondence between the input landmarks from which they have been projected in their respective image, and by further distinction according to projection direction and/or projection target in the case where a plurality of these was used. Additionally, the processor further executes instructions for registering the images using all or a selected subset of all combined input landmark correspondences and transferred correspondences between the new projected landmark points.

In accordance with another aspect, a method of automatically generating additional corresponding points from input existing point landmarks in correspondence across multidimensional images includes projecting input landmarks along one or more determined directions onto one or more determined projection targets in each image, and identifying a candidate new point at every location where each projection ray path intersects with a projection target. The method further includes assigning correspondence between new points across images by transfer of the correspondence between the input landmarks from which they have been projected in their respective image, and by further distinction according to projection direction and/or projection target in the case where a plurality of these was used. Additionally, the method further includes registering the images using all or a selected subset of all combined input corresponding landmark correspondences and transferred correspondences between the new projected landmark points.

One advantage is that landmark-based image registration quality is improved.

Another advantage resides in facilitating automated propagation of segmentations or contours across images.

Still further advantages of the subject innovation will be appreciated by those of ordinary skill in the art upon reading and understanding the following detailed description.

The innovation may take form in various components and arrangements of components, and in various steps and arrangements of steps. The drawings are only for purposes of illustrating various aspects and are not to be construed as limiting the invention.

The subject innovation overcomes the aforementioned problems by using directional projection to automatically generate additional point correspondences from existing corresponding point landmarks in multiple multidimensional images. Images may be of any dimensionality up from two. The input existing landmarks may have been manually or automatically located, labeled and matched in the input multiple images. The transferred additional correspondences between projected landmarks can improve the quality of landmark-based image registration and of any downstream processing, e.g. registration-based image segmentation (contour propagation), or image fusion. The methods and systems described herein can be used to efficiently boost deformable registration in any context, be it based on manual landmarks or on automated interest points, and boost its exploitation, e.g. for contour propagation on multidimensional image data or for multimodality fusion. In the particular context of radiotherapy treatment, the described systems and methods can be used for assessing delivered treatment and enables the implementation of adaptation schemes in clinical practice; it can also be useful in the registration of 3D images at different time points such as in 4D Computed Tomography (4D CT), 4D Cone-Beam Computed Tomography (4D CBCT), 4D magnetic resonance (4D MR), 4D imaging in which the temporal series of images includes a mixture of imaging modalities, and the like.

Figure 1:
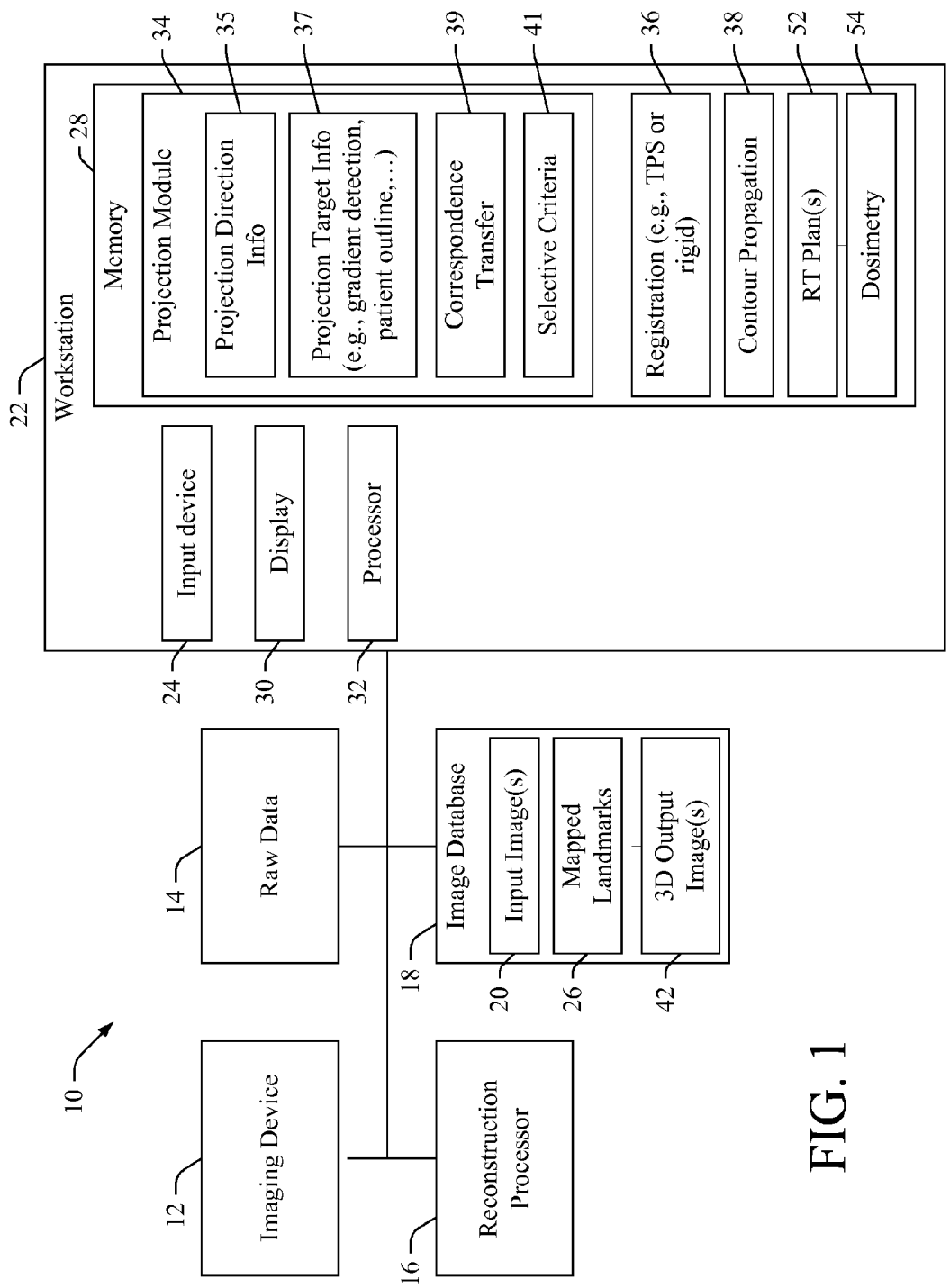
FIG. 1 illustrates a system that facilitates projecting known corresponding landmarks from input images along determined directions onto determined projection targets in the images to increase a number of reliable point correspondences across the images for reliable image registration.

FIG. 1 illustrates a system 10 that facilitates projecting known corresponding landmarks from input images along determined directions onto determined projection targets in the images to increase a number of reliable point correspondences across the images for reliable image registration. The system 10 may include a medical imaging device 12, such as a nuclear scanner (e.g., a positron emission tomography (PET) scanner, a single photon emission computed tomography (SPECT) scanner, etc.), a computed tomography (CT) scanner, a magnetic resonance (MR) imaging device, or the like. The imaging device 12 scans a patient or region of interest to acquire and store raw data 14. A reconstruction processor 16 reconstructs the raw data into one or more images, which are stored in an image database 18. Imaging devices of other imaging modalities can also be connected with the database to store other modality images therein. In one embodiment, two input images are used, including a current image, and a previous image, such as a most recent image, an initial image, or the like. In another embodiment, the input images are acquired periodically to monitor a patient's anatomy, such as over the course of a radiotherapy treatment plan or the like. In another embodiment, the input images are one atlas image or previous patient image and one new image of an unseen patient, where structure delineation and/or radiation therapy planning can be transferred from the former to the latter through registration. Multiple reconstructed images are employed as input images 20 in which matched landmarks 26 are identified (e.g., automatically or manually), where landmarks mean labeled points with an assigned spatial location, and matched means correspondence has been established among the landmarks across images. In one embodiment for instance, at a workstation 22 (e.g., a computer or the like), one or more human observers have employed an input device 24 (e.g., a keyboard, mouse, stylus, microphone, touchscreen, touchpad, or the like) to interactively identify, locate, label and/or match corresponding landmarks in the input images 20, e.g. anatomical landmarks. Input matched landmark information 26 is stored in a memory 28, and the input images 20 with matched landmark information can be presented to the user on a display 30. In another embodiment, a processor has automatically located and matched the input landmarks 26 of the projection module 34 (e.g., a spinous process, an organ or tumor boundary, etc.) using known techniques. For example, computer-based landmark detection software has been used to locate corresponding landmarks in both images, such as salient image features or the output of a corner or blob detector or interest point detector or the like.

The memory 28 also stores a projection module 34 that, when executed by the processor 32, projects landmarks along determined projection directions 35 to find intersecting points between the projection ray paths and boundaries in the images, or organs, or structures inside of the subject, or with an exterior surface of the subject, or any other projection target 37, to increase the potential number of point correspondences to an acceptable level for improved image registration and/or contour propagation.

A projection target 37 may be an anatomical structure or, for instance, an input existing contour surface of an anatomical structure, a natural boundary between structures or image intensities, tissues, a strong image intensity gradient, a flat or plate-like local feature in the image, or the like, or can be a computer-generated target. That is, the projection target may be a natural boundary in the image or a delineated contour, which locally acts as a screen onto which projection ray paths are cast. The projection target(s) can be explicitly materialized or implicitly defined. In one embodiment, the skin background transitions automatically detected on the fly as belonging to the patient outline along the projection paths are employed by the projection module 34 as projection targets 37 in every image (this generates new reliably corresponding points located on the patient outline and stemming from internal distinctive landmarks, whereas it would be risky to identify and match landmarks on the patient outline alone as they would lack distinctiveness). A projection target may not be found before the image bounds along the projection ray path, in which case no candidate new point is identified for the given landmark and direction.

A landmark in a 3D image may be projected in multiple directions according to projection direction information 35 (e.g., along the x, y, and/or z axes in one example) to generate registration list of candidate additional control points. In one embodiment, the projection module projects one or more landmarks in left, right and inferior anatomical directions (i.e., in 3D) relative to the plane of the image, although other directions are possible. The input landmarks 26 are projected along the determined projection directions 35 onto the projection targets 37 by projection module 34 when executed by the processor 32. In one embodiment, the authorized directions are determined to be the same for the whole set of input landmarks. In another embodiment, the authorized directions are determined independently for every single input landmark, for instance depending upon the geometric relationship relative to some reference.

Correspondence transfer 39 assigns correspondence between the new points across images by transferring the original correspondence from the input landmarks from which they have been projected in their respective image. In the case where a plurality of projection directions and/or a plurality of projection targets were used, further distinction as to the corresponding point set identity is carried out according to projection direction and/or projection target.

The projection module 34 is a directional projection algorithm (e.g., a set of computer-executable instructions) that is executed to project the existing corresponding landmarks onto projection target(s) 37, thus generating candidate additional control points for point-based registration. The candidate additional points are the intersection points of the projection ray paths with projection targets. These candidate projected landmarks are validated or rejected by determining whether they satisfy one or more determined criteria 41. In one embodiment, each additional corresponding point is selected as valid to be used for the final image registration based upon evaluating one or more individual selective criteria, such as, but not limited to, geometric criteria, e.g. point position relative to some reference or avoidance of no-go regions along the projection ray path, local appearance and/or contrast criteria, local texture and structure criteria, local shape criteria. The criteria may be evaluated locally at the candidate point location and/or along the whole projection ray path. The incidence angle criterion is a highly desirable criterion to ensure reliability of the additional point localization. The angle threshold value can be e.g. within sixty degrees of orthogonality, or varying according to landmark location and/or other criteria. In one embodiment, each set of corresponding additional points is selected as valid to be used for the final image registration based upon evaluating one or more collective selective criteria involving all new points sharing the correspondence, such as, but not limited to comparative geometric criteria, e.g. change in position relative to some reference, comparative local appearance and/or contrast criteria across images, comparative local texture and structure criteria across images, comparative local shape criteria. Again, the criteria may be evaluated locally at the candidate point locations and/or along the whole projection ray paths. In practice, the reliability of the generated additional correspondences between projected landmarks for being used as control points of registration stems: a) from the prior reliability of the input corresponding landmarks as determined by one or more reliability metrics or thresholds; b) from the selection of predefined distinct projection directions 35, such as classical anatomical directions or diagonal directions, which may depend on which image sub-region each landmark is located in; and c) from satisfying at least one criterion 41 upon the incidence angle of the projection direction onto the projection target, e.g. with respect to the image intensity gradient or to the normal vector of an existing contour surface, in correspondence across images. Therefore, further selective criteria may involve and/or combine measured reliability values of the input landmarks or functions thereof, these values being provided to the projection module as part of the input data. For the sake of robustness or efficiency, further selective criteria may be imposed on projection in various embodiments. In a semi-automated embodiment, the clinician or other operator can verify, and accept or correct or reject the positions the candidate projected landmarks in the displayed image. The foregoing facilitates improving the quality of landmark-based image registration and of any downstream processing, e.g. of propagation of segmentations across images, or multimodality fusion.

The processor 32 executes an automatic registration module 36 that automatically registers the two images using the original landmark correspondences and validated candidate new point correspondences. In one embodiment, thin-plate splines (TPS) (such as described in F. L. Bookstein. Principal warps: Thin-plate splines and decomposition of deformations. *IEEE T Pattern Anal* 1989;11(6):567-585) can be used to provide a non-rigid transformation to interpolate the whole deformation field in between corresponding features used as reliable anchor points. In another embodiment, a rigid registration algorithm can be employed.

In one embodiment, a contour propagation module 38 is then executed by the processor to delineate one or more contours in one image based on the registration map obtained with an image containing existing contours, that is, contours are transferred across images based on the point-based registration.

In one embodiment, the memory 28 stores one or more radiotherapy plans 52 that are adjustable based on information obtained from the 3D output images. For instance, a series of patient images taken over a course of treatment can be played back to a clinician on the display 30 in cine mode to show changes in the patient's anatomy over time in response to and/or unrelated to the treatment. The displayed images can be displayed with the contours to help the clinician see the boundaries more clearly. If a clinician determines that, for example, a tumor being treated is not shrinking rapidly enough, then the clinician can increase a radiation dose to the tumor for a subsequent treatment course. Additionally, the memory can store dosimetry information 54 to facilitate clinical decision making.

As stated above, the system 10 includes the processor 32 that executes, and the memory 28, which stores, computer-executable instructions (e.g., routines, programs, algorithms, software code, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Figure 2:
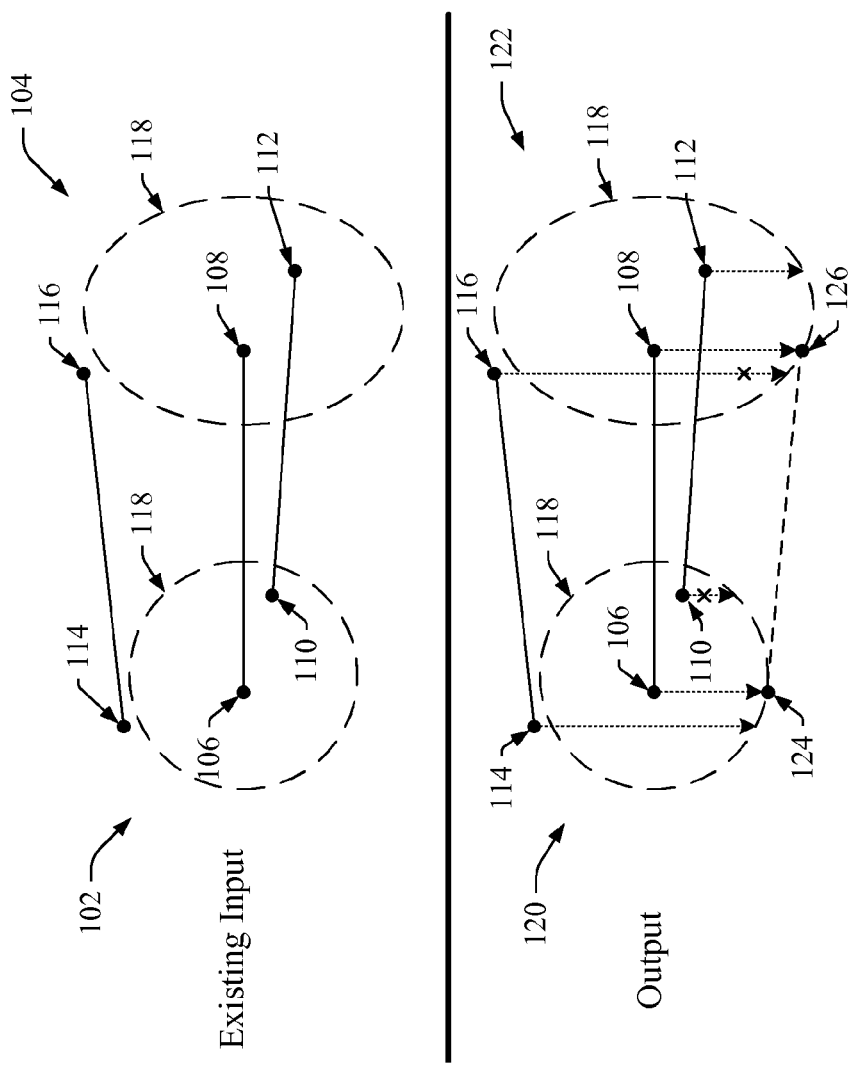
FIG. 2 illustrates an example of automatic projection of corresponding landmarks in one direction in a current pair of images, in accordance with various aspects described herein.

FIG. 2 illustrates an example of automatic projection of corresponding landmarks in one direction in a current pair of images 102 and 104, in accordance with various aspects described herein. A plurality of corresponding known landmark pairs are shown, which have been manually or automatically registered or matched, and provided as the input matched landmarks 26 of FIG. 1. For instance, a known landmark 106 identified in image 102 corresponds to a known landmark 108 identified in image 104; known landmark 110 corresponds to known landmark 112; and known landmark 114 corresponds to known landmark 116. The projection module 34 of FIG. 1 projects the corresponding landmarks in a negative y direction in the illustrated example, as illustrated by the downward-pointing hashed arrows. In the illustrated example, an explicitly delineated contour (manual or automated) is used as projection target 37 of FIG. 1. In the example, a determined incidence angle criterion is applied to resulting projected landmarks to verify whether the projected landmarks are reliable in which case they are deemed valid. For instance, the projection of the landmark 116 does not result in a valid candidate additional point because the projection path intersects with the projection target 118 at an incidence angle that is too much tangential. Therefore, even though the projection of the corresponding landmark 114 does result in a valid candidate additional point, this additional point has no corresponding point, that is the pair of landmarks 114 and 116 results in no additional correspondence to be used for registration. Similarly, the projection of landmark 110 also does not meet the incidence angle criterion when its path intersects with the projection target. Therefore, although the projections of corresponding landmarks 112 are valid due to an acceptable incidence angle, the pair of landmarks 110 and 112 does not result in any additional corresponding point pair. However, the projections of landmarks 106 and 108 both achieve a substantially orthogonal incidence to the projection target and therefore each result in a valid candidate extra point, namely point 124 and point 126 respectively. New points 124 and 126 also meet other criteria if any, which may be imposed upon individual projected landmarks and/or upon pairs of projected landmarks (not shown in FIG. 2). Correspondence is then established and assigned between new points 124 and 126 by transfer of the correspondence between the parent landmarks 106 and 108 from which they descend (in this example, the new correspondence relationship needs no further distinction as only a single projection direction and a single projection target are used). That is, point 106 identified in image 102 corresponds to new point 108 identified in image 104. Therefore, a new pair of corresponding points 124 and 126 is generated, to be used in subsequent point-based registration. The subsequent point-based registration will use the input landmark pairs plus the subset of only valid pairs of valid projected landmarks, namely input pairs 106-108, 110-112 and 114-116, plus additional pair 124-126.

Figure 3:
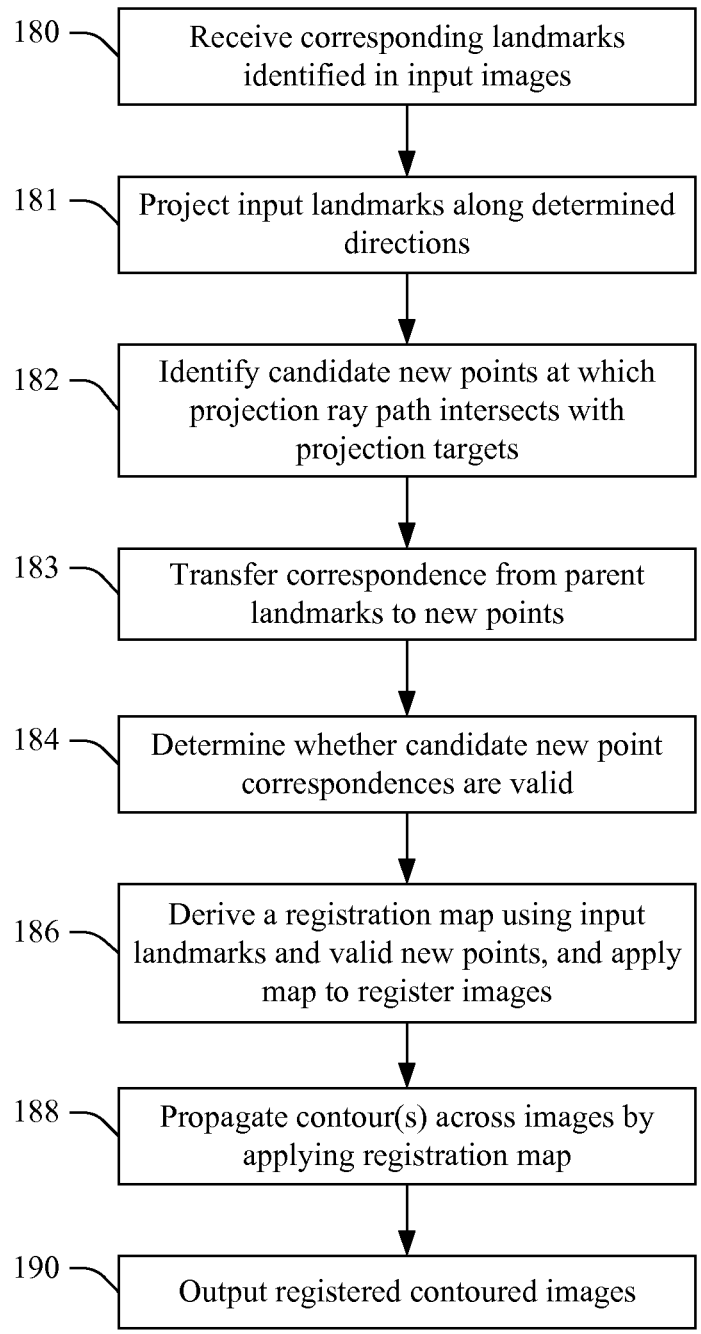
FIG. 3 illustrates a method for projecting known landmarks onto projection targets to enhance image registration and any subsequent contour propagation between images, in accordance with various aspects described herein.

FIG. 3 illustrates a method of projecting known landmarks onto projection targets to enhance image registration and any subsequent contour propagation between images, in accordance with various aspects described herein. At 180, corresponding landmarks identified in the input images are received. At 181, landmarks in each image are independently projected along determined directions (e.g.: x, y, z axes relative to the plane of the image(s), predefined angles relative to these, e.g. oblique axes, diagonals; along lateral left/right, posterior/anterior, and superior/inferior axes relative to the patient, predefined angles relative to these, e.g. oblique axes, diagonals; etc.). At 182, points at which the landmark projection ray path intersects with the projection targets are identified as candidate additional points. Intersection points with projection targets are determined, in one embodiment, using gradient detection or the like to detect projection target voxels in the image. At 183, correspondence is transferred from parent landmarks to new points. At 184, intersection points, i.e. candidate projected landmark points in correspondence, are validated or rejected according to individual selective criteria or collective criteria across images. For instance, one or more criteria may be applied to the projected landmark points. In one embodiment, a determination is made regarding whether the projection ray path for each individual input landmark intersects with a projection target at an angle within a preselected range (e.g., substantially close to 90° orthogonality) relative to the projection target orientation. Subsequently, if the projection ray paths from corresponding input landmarks onto the respective projection targets in all input images are within the acceptable angular criteria, then the new correspondence between candidate projected landmark points is taken as valid. If one of the candidate projected landmark points does not meet the criteria, then the candidate correspondence is rejected. At 186, the images are registered using the input landmark correspondences plus the newly identified and validated candidate projected landmark correspondences. At 188, contours available in one of the registered images can be propagated to the other images by applying the registration map derived from the validated landmark correspondences. At 190, a segmented or contoured 3D slice or other output image is generated of the registered current image. The method is performed each time a new image is acquired in a time series, to register the current image to the previous images and the segmentation or contour thereof.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates automatically generating additional corresponding points from input existing point landmarks in correspondence across multidimensional images, including:
   an image database that stores at least two images each containing a set of landmarks with tracked correspondence across images; and
   a processor that executes computer-executable instructions stored in a memory, to perform the steps of:
      projecting input landmarks along one or more determined directions onto one or more determined projection targets in each image;
      identifying a candidate additional point at each location where each projection ray path intersects with a projection target in each image;
      assigning correspondence between additional points across images by transfer of the correspondence between the input landmarks from which they have been projected in their respective image, and by further distinction according to projection direction and/or projection target in the case where a plurality of these is used; and
      registering the images using all or a selected subset of all combined input existing landmark correspondences and transferred correspondences between the new projected landmark points.

2. The system according to claim 1, wherein each additional corresponding point is selected as valid to be used for the final image registration based upon evaluating one or more individual selective criteria.

3. The system according to claim 2, wherein each projected landmark point is deemed valid to ensure a reliable registration when it meets the individual selective criterion that the incidence angle of the directional projection ray path onto the projection target(s) is within a preselected angular range astride orthogonality, i.e. not substantially close to being tangential.

4. The system according to claim 1, wherein each set of corresponding additional points is selected as valid to be used for the final image registration based upon evaluating one or more collective selective criteria involving all new points sharing the correspondence.

5. The system according to claim 1, wherein at least one of:
one candidate new point is retained as valid along each projection path; and
one additional attempt is made to generate a candidate new point along each projection path in the projection direction.

6. The system according to claim 1, wherein one or more authorized projection directions are determined to be the same for the entire set of input landmarks.

7. The system according to claim 1, wherein one or more authorized projection directions are determined independently for each input landmark, based on a local criteria.

8. The system according to claim 1, wherein registering the images includes non-rigidly registering the projected landmarks using a spline.

9. The system according to claim 1, wherein registering the images includes rigidly registering the projected landmarks.

10. The system according to claim 1, wherein the processor performs the prior step of:
locating and/or matching input landmarks in the input multiple images, at least one of manually and automatically.

11. The system according to claim 1, wherein the processor further performs the subsequent step of:
propagating at least one of contours and another object of interest across images using a registration map.

12. The system according to claim 1, wherein the image database includes a plurality of registered images taken at a series of times and the processor displays registered previous and current images in cine mode.

13. The system according to claim 1, wherein the processor further performs the step of:
modifying a previously-created radiotherapy plan based at least in part on a registered current image.

14. The system according to claim 1, wherein at least two image volumes are used, each containing a set of landmarks that are identified at least one of manually and automatically the landmarks having tracked correspondence across image volumes and across one or more projection target surface-like objects.

15. A method of automatically generating additional corresponding points from input existing point landmarks in correspondence across multidimensional images, including:
projecting input landmarks along one or more determined directions onto one or more determined projection targets in each image;
identifying a candidate additional point at each location where each projection ray path intersects with a projection target in each image;
assigning correspondence between additional points across images by transfer of the correspondence between the input landmarks from which they have been projected in their respective image, and by further distinction according to projection direction and/or projection target in the case where a plurality of these is used; and
registering the images using all or a selected subset of all combined input existing landmark correspondences and transferred correspondences between the new projected landmark points.

16. The method according to claim 15, wherein each additional corresponding point is selected as valid to be used for the final image registration based upon evaluating one or more individual selective criteria.

17. The method according to claim 16, wherein each projected landmark point is deemed valid to ensure a reliable registration when it meets the individual selective criterion that the incidence angle of the directional projection ray path onto the projection target(s) is within a preselected angular range astride orthogonality, not substantially close to being tangential.

18. The method according to claim 15, wherein each set of corresponding additional points is selected as valid to be used for the final image registration based upon evaluating one or more collective selective criteria involving all new points sharing the correspondence.

19. The method according to claim 15, wherein at least one of:
one candidate new point is retained as valid along each projection path; and
one additional attempt is made to generate a candidate along each projection path in the projection direction.

20. The method according to claim 15, wherein one or more authorized projection directions are determined to be the same for the whole set of input landmarks.

21. The method according to claim 15, wherein one or more authorized projection directions are determined independently for every single input landmark, based on a local criteria.

22. The method according to claim 15, wherein registering the images includes non-rigidly registering the projected landmarks using a spline.

23. The method according to claim 15, wherein registering the images includes rigidly registering the projected landmarks.

24. The method according to claim 15, further including the prior step of:
locating and/or matching input landmarks in the input multiple images, at least one of manually and automatically.

25. The method according to claim 15, further including the subsequent step of:
propagating at Least one of contours and another object of interest across images using a registration map.

26. The method according to claim 15, further including:
storing a plurality of registered images taken at a series of different times; and
displaying registered previous and current images in cine mode.

27. The method according to claim 15, further including:
modifying a previously-generated radiotherapy plan based at least in part on a registered current image.

28. The method according to claim 15, wherein at least two image volumes are used, each containing a set of landmarks that have been identified at least one of manually and automatically, the landmarks having tracked correspondence across image volumes arid across one or more projection target surface-like objects.

29. A processor or computer-readable medium carrying a computer program that controls one or more processors to perform the method of claim 15.

* * * * *